United States Patent
Lee et al.

(10) Patent No.: US 7,864,225 B2
(45) Date of Patent: Jan. 4, 2011

(54) SYSTEM AND METHOD FOR DISPLAYING IMAGE CAPTURE TIME

(75) Inventors: Seung Min Lee, Suwon-Si (KR); Young Joon Park, Suwon-Si (KR)

(73) Assignee: Samsung Techwin Co., Ltd., Changwon (KR)

( * ) Notice: Subject to any disclaimer, the term of this patent is extended or adjusted under 35 U.S.C. 154(b) by 1185 days.

(21) Appl. No.: 11/353,971

(22) Filed: Feb. 15, 2006

(65) Prior Publication Data
US 2006/0291818 A1  Dec. 28, 2006

(30) Foreign Application Priority Data
Jun. 23, 2005  (KR) .............. 10-2005-0054445

(51) Int. Cl.
*H04N 5/76* (2006.01)
(52) U.S. Cl. .............. 348/231.3; 348/333.02
(58) Field of Classification Search ............ 348/231.99, 348/231.2, 231.5, 333.02
See application file for complete search history.

(56) References Cited

U.S. PATENT DOCUMENTS

| | | | |
|---|---|---|---|
| 2002/0093571 A1* | 7/2002 | Hyodo | 348/220 |
| 2004/0249861 A1* | 12/2004 | Hoshino et al. | 707/104.1 |
| 2005/0104976 A1* | 5/2005 | Currans | 348/231.5 |
| 2005/0140791 A1* | 6/2005 | Anderson | 348/207.99 |
| 2005/0152683 A1* | 7/2005 | Ryu | 386/95 |
| 2005/0237422 A1* | 10/2005 | Kido | 348/362 |

FOREIGN PATENT DOCUMENTS

KR   1020040098759   11/2004

* cited by examiner

*Primary Examiner*—Gevell Selby
(74) *Attorney, Agent, or Firm*—Sughrue Mion, PLLC

(57) ABSTRACT

A system and method for displaying together images and an image capture time of captured images comprises a storage device and a viewer for displaying an image capture time. The storage device stores image data obtained from an image capture unit and environment data, which includes a storage medium, indicative of environment conditions where images are captured, and creates subtitle data based on the environment data to display a time of capturing the images as a subtitle. Also, The viewer receives the image data and subtitle data to play back the captured images based on the received data, and displays the image capture time using the subtitle data while the captured images are played back.

16 Claims, 6 Drawing Sheets

SYSTEM AND METHOD FOR DISPLAYING IMAGE CAPTURE TIME

CROSS-REFERENCE TO RELATED APPLICATION

This application claims the benefit under 35 U.S.C. §119(a) of Korean Patent Application No. 2005-54445, filed on Jun. 23, 2005 in the Korean Intellectual Property Office, the entire disclosure of which is hereby incorporated by reference.

BACKGROUND OF THE INVENTION

1. Field of the Invention

The present invention relates to a system and method for displaying an image capture time. More particularly, the present invention relates to a system and method for displaying together images and a time the images were captured, when a general viewer installed in a personal computer plays back images stored in a storage medium.

2. Description of the Related Art

Generally, various viewers have been introduced, such as WINDOWS Media Player, REALPLAYER, and QUICKTIME Player, which are capable of playing back images in real time using streaming technology. These systems provide users with the ability to increasingly play images that are stored in other storage media on viewers installed in their personal computers (PCs). Such prior art embodiment is disclosed in Korean Patent Publication No. 2004-0098759, entitled, "System and Method for Performing Observation in Remotely Real Time Using a Mobile Communication Terminal and/or a PC."

In Korean Patent Publication No. 2004-0098759, the system includes a web camera for capturing a moving image for an observation target in an observation site in which the web camera is installed. An encoder is used for converting the moving image captured by the image camera into standard moving image data to be transmitted via the Internet. A streaming server transmits the standard moving image data transmitted from the encoder, in a moving image stream via the Internet, according to a confirmation request. A receiving medium of a PC and/or a mobile communication terminal, which displays the moving image stream transmitted from the streaming server, allows users to view and listen to the moving image stream at a place remotely located from the observation target. As a result, the users can observe the moving image in real time.

Here, the moving image signal taken by a monitoring camera is converted into a file that is formatted, for example, in Advanced Systems Format (*.asf), or Real Media (*.rm). The file can be played by a general viewer, such as WINDOWS Media Player, by transmitting the file to the streaming server and then to the general viewer installed in the PC.

However, such prior art method has disadvantages in that when the moving image signals are played back by the general viewer installed in the PC, a capturing time of the images is not displayed. Therefore, a user cannot precisely recognize the time the corresponding images were captured if it is important to identify the time of capture for monitoring or security taken by monitoring cameras. As a result, the prior art method has drawbacks in the general viewer when images are played without displaying the image capture time.

Accordingly, there is a need for an improved system and method for displaying an image capture time when displaying an image.

SUMMARY OF THE INVENTION

An aspect of the present invention is to address at least the above problems and/or disadvantages and to provide at least the advantages below. Accordingly, an aspect of the present invention is to provide a system and method for displaying images and a time of capturing together when a general viewer installed in a personal computer, plays back images stored in a storage medium.

Additional aspects and/or advantages of the invention will be set forth in part in the description which follows and, in part, will be obvious from the description, or may be learned by practice of the invention.

In accordance with an aspect of exemplary embodiments of the present invention, there is provided a system for displaying an image capture time, in which the system comprises a storage device for storing image data provided from an image capture unit and environment data, which comprises a storage medium, that is indicative of environment conditions where images are captured, and creating subtitle data based on the environment data to display a time of capturing the images as a subtitle. A viewer for receiving the image data and subtitle data in order to play back the captured images based on the received image data, and displaying the subtitle data while the captured images are played back, which comprises the image capture time.

Preferably, the subtitle data comprises subtitle files created in an information conversion unit of the storage device, in which the subtitle files using database (DB) data and event data provided in the environment data.

Preferably, the storage device further comprises an environment data extraction unit for extracting DB data and event data, which are stored in the storage medium.

Preferably, the viewer is one of WINDOWS Media Player, QUICKTIME Player, or REALPLAYER.

Preferably, the viewer is operated in a personal computer (PC) or digital video player such as a DIVX Player.

Preferably, the image capture unit comprises a monitoring camera, and the storage device comprises a digital video recorder (DVR), wherein the image data and subtitle data are stored in one of a compact disc (CD), a digital video disc (DVD), a universal serial bus (USB) memory or an external hard disk drive (HDD), and transferred from the DVR to a viewer that is operated in a PC or digital video player.

In accordance with another aspect of exemplary embodiments of the present invention, there is provided a system for displaying an image capture time, in which the system comprises a storage device for storing image data provided from an image pickup and environment data that is indicative of environment conditions where images were captured in a storage medium. A playback device receives the captured images and environment data transmitted together, creates subtitle data based on the environment data, and displays the image capture time as a subtitle using the subtitle data, while the captured images are played back.

Preferably, the subtitle data includes subtitle files created in an information conversion unit of the playback device, in which the subtitle files are created using DB data and event data as the environment data.

Preferably, the image and subtitles are displayed in a viewer operated in the playback device, in which the viewer is one of WINDOWS Media Player, QUICKTIME Player, or REALPLAYER.

Preferably, the image capture unit comprises a monitoring camera, and the storage device includes a digital video recorder (DVR), wherein the image data and subtitle data are stored in a storage medium, such as, a CD, a DVD, a USB memory or an external HDD, and transferred from the DVR to the playback device that is operated in the PC or digital video player.

Preferably, the image capture unit and storage device are included in a camcorder, wherein the image data and subtitle data can be transferred via a communication method from the camcorder to the playback device that is operated in the PC or digital video player.

In accordance with another aspect of exemplary embodiments of the present invention, there is provided a method for displaying an image capture time, in which the method comprises the steps of storing image data provided from capturing images and environment data indicative of environment conditions where the images are captured. Subtitle data is created based on the environment data in order to display a time of capturing the images as a subtitle. The image data and subtitle data is received from a viewer which independently operates in the storage device, the image capture time is displayed using the subtitle data.

Preferably, the subtitle data comprises subtitle files created in an information conversion unit of the storage device, in which the subtitle files are created using DB data and event data provided in the environment data.

Preferably, the subtitle file is a text-based subtitle file or a graphic-based subtitle file.

Preferably, the viewer is one of WINDOWS Media Player, QUICKTIME Player, or REALPLAYER.

In accordance with yet another aspect of exemplary embodiments of the present invention, there is provided a method for displaying an image capture time, in which the method comprises the steps of storing image data provided by capturing images and environment data indicative of environment conditions where images are captured. Environment data is received from a playback device that creates subtitle data, in order to display a time of capturing the images as subtitles. The captured images are played in a viewer installed in the playback device, and the image capture time is displayed using the subtitle data.

Preferably, the subtitle data comprises subtitle files created in an information conversion unit of the playback device, in which the subtitle files are created using DB data and event data provided in the environment data.

Preferably, the subtitle file is a text-based subtitle file or a graphic-based subtitle file.

Preferably, the viewer is one of WINDOWS Media Player, QUICKTIME Player, or REALPLAYER.

Other objects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

The above and other objects, features and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
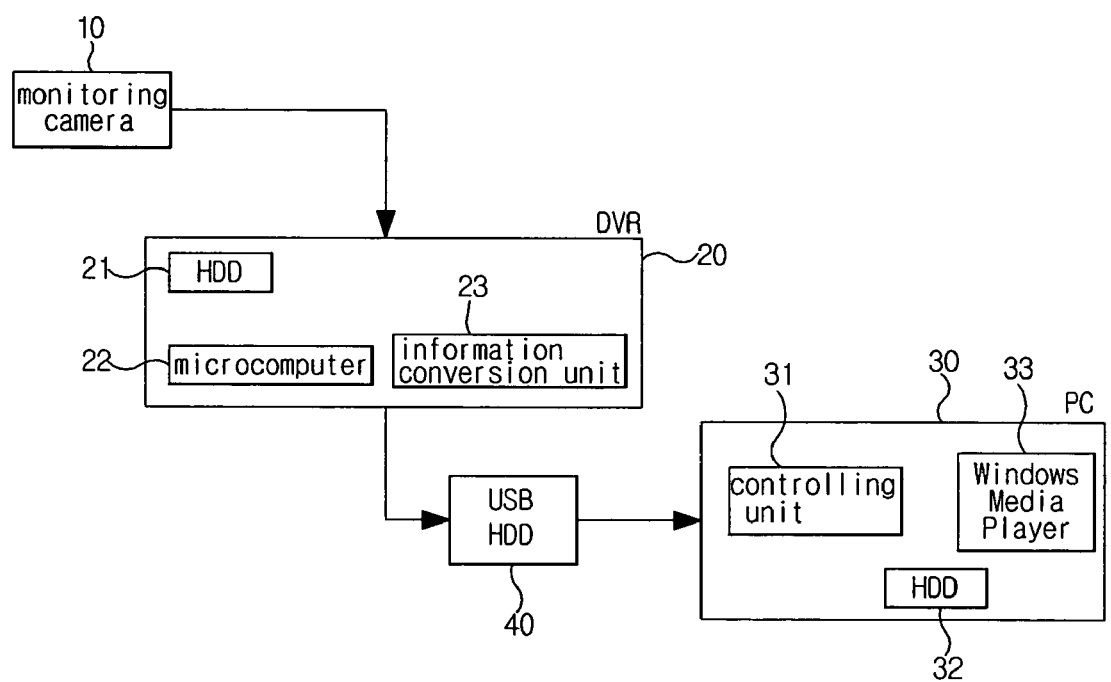
FIG. 1 is a block diagram illustrating a system for displaying an image capture time according to an exemplary embodiment of the present invention.

FIG. 1 is a block diagram illustrating a system for displaying an image capture time according to an exemplary embodiment of the present invention. The system includes a monitoring camera 10, a digital video recorder (DVR) 20, a personal computer (PC) 30, and a universal serial bus hard disk drive (USB HDD) 40.

The DVR 20 preferably includes a hard disk drive (HDD) 21 for storing image data taken by the monitoring camera 10 and environment data indicative of environment conditions where the images were captured. The DVR 20 also includes an information conversion unit 23 for converting image data formats and creating subtitle files based on the environment data. A microcomputer 22 controls the operations of the DVR 20.

The image data stored in the HDD 21 preferably consists of video and audio streams. The environment data also stored in the HDD 21 includes a database (DB) file for storing a time of capturing an intra-coded frame (I-frame) and position of the captured I-frame, which are included in each video stream. The environment data further includes an event file for storing a beginning time of capturing images, an end time of capturing the images, and image data types. The image data types preferably includes an indicator that is indicative as to whether image data is captured as a user directly adjusts movement of a monitoring camera, or whether image data is automatically captured in an emergency situation.

Figure 2:
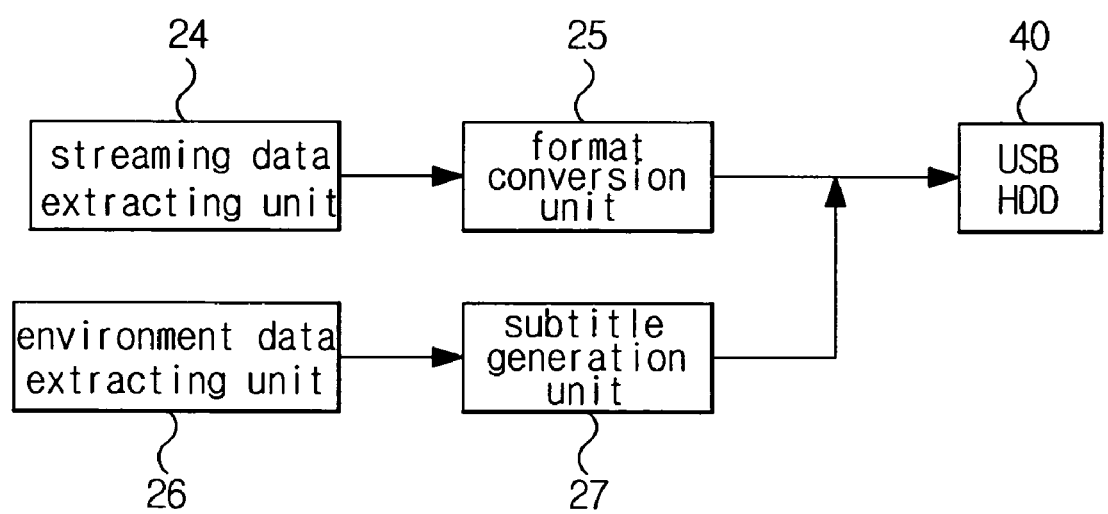
FIG. 2 is a block diagram illustrating an information conversion unit of FIG. 1 in detail.

The information conversion unit 23 preferably includes, as shown in FIG. 2, a streaming data extracting unit 24, a format conversion unit 25, an environment data extracting unit 26, and a subtitle generation unit 27.

The streaming data extracting unit 24 extracts the video and audio streaming data stored in the HDD 21 and transmits the extracted data to the format conversion unit 25. The format conversion unit 25 converts the format of the video and audio streaming data into a file format, such as Audio Video Interleave (*.avi file), Advanced Streaming Format (*.asf file), or Movie (*.mov file), which can be played by general viewers, such as, WINDOWS Media Player, REALPLAYER, QUICKTIME, and the like.

The environment data extracting unit 26 extracts the DB data as the environment data and event data, and then transmits the data to the subtitle generation unit 27. The subtitle generation unit 27 creates a subtitle file which can be displayed by the general viewer when playing back captured images using the DB data and event data. Preferably, the subtitle displayed in the general viewer is the time when each image is captured. Also, the subtitle preferably includes other environment information, such as position of a monitoring camera, and weather conditions when the images are captured. The subtitle files can be created on the basis of text-based subtitle files, such as *.smi, *.smil, or *.srt; or graphic-based subtitle files, such as *.sub, *.idx, *.don.

Additionally, the DVR 20 includes a movement monitoring function and control function for automatic pan/tilt/zoom operations of the monitoring camera.

Referring back to FIG. 1, the PC 30 is preferably implemented with a general personal computer that includes a controlling unit 31 for controlling operations of the PC 30, and a HDD 32. The PC 30 may set WINDOWS Media Player 33 as a general viewer therein. Although, the exemplary embodiments of the present invention described herein uses WINDOWS Media Player 33 as the general viewer installed in the PC 30, embodiments of the invention can also be implemented with any other suitable viewer, such as QUICKTIME Player, REALPLAYER, and the like. Moreover, exemplary embodiments of the present invention employ the PC 30 as a player for the general viewer. However, other devices, such as a stand alone digital video player, can be operated as the player for the general viewer.

The USB HDD 40 stores a moving image file and a subtitle file, which are created in the DVR 20 and transmits the files to the PC 30. For example, the USB HDD 40 may be inserted into a USB port (not shown) of the DVR 20, the moving image file and the subtitle file stored in the DVR 20 can be transferred to the USB HDD 40. Then, as the USB HDD 40 is inserted into a USB port (not shown) of the PC 30, the moving image file and the subtitle file stored in the USB HDD 40 can be transferred to the HDD 32 of the PC 30.

Although exemplary embodiments of the present invention preferably uses a USB HDD 40 to transfer various data stored in the DVR 20 to the PC 30, the transfer between the two devices can be implemented with a CD, DVD, an external HDD, or with any other suitable device or method.

Figure 3:
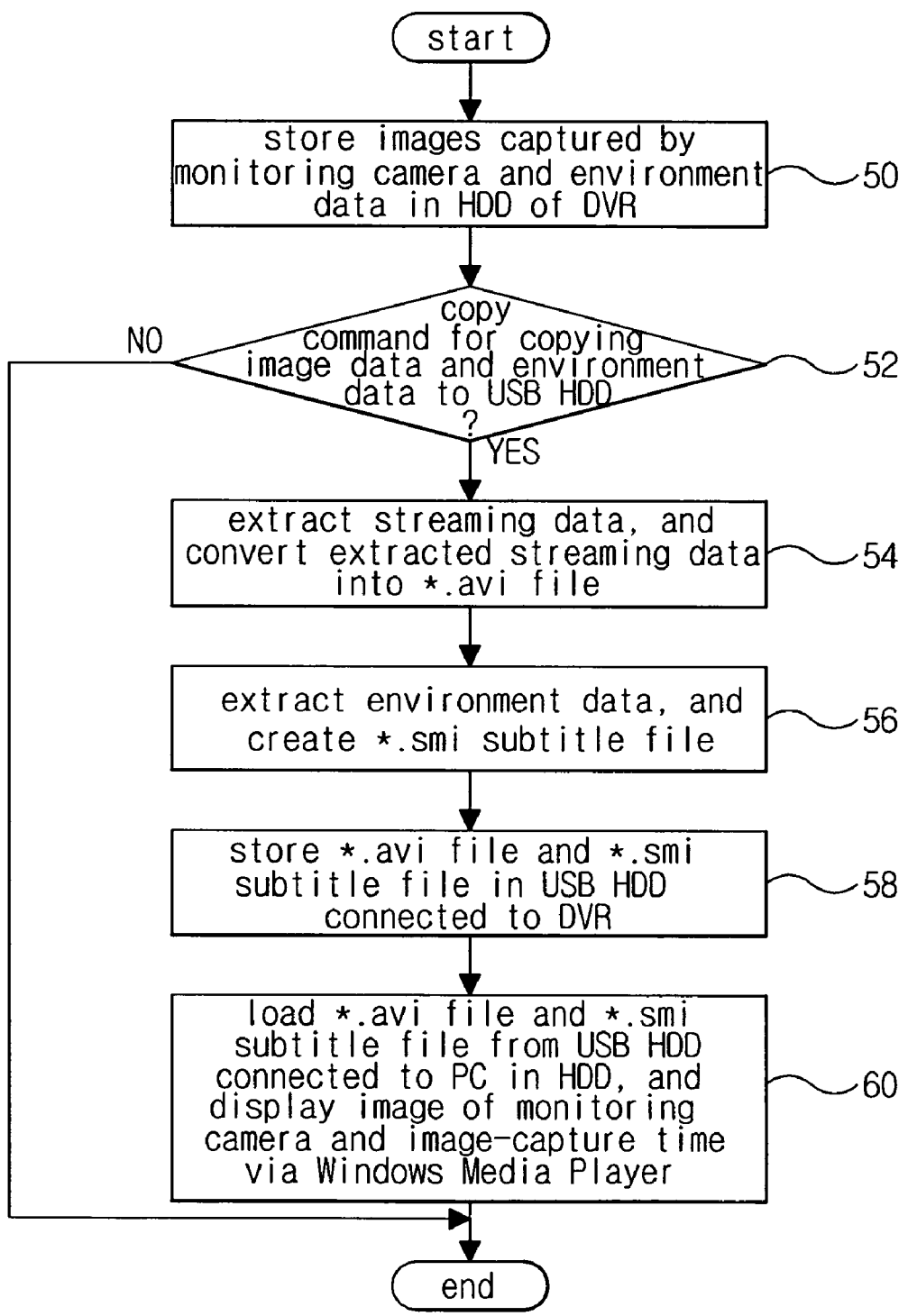
FIG. 3 is a flow chart illustrating a method for displaying an image capture time according to an exemplary embodiment of the present invention.

With reference to FIG. 3, a system and a method for displaying an image capture time, according to an exemplary embodiment of the present invention, are described in detail below.

When the monitoring camera 10 captures images of a place to be monitored, image data is stored in the HDD 21 of the DVR 20. Simultaneously, environment data indicative of environment conditions where images are captured, are also stored in the HDD 21 in step 50.

Next, the microcomputer 22 of the DVR 20 makes a determination as to whether a command for copying the image data and environment data to the USB HDD 40 is inputted by a user in step 52. If such determination is negative, the procedure is terminated. However, if the determination is positive, the streaming data extracting unit 24 extracts streaming data therefrom. Then, the format conversion unit 25 converts the format of the streaming data into a moving image file formatted as *.avi in step 54. Also, the environment data extracting unit 26 extracts DB data and event data. The subtitle generation unit 27 creates a subtitle file formatted as *.smi, based on the DB data and event data, in step 56. When the moving image file *.avi and the subtitle file *.smi are created, the files are stored in the USB HDD 40 connected to the USB port of the DVR 20 in step 58.

When the USB HDD 40 is inserted into the USB port of the PC 30 and a copy command is inputted in the PC 30 through a mouse or a key-board, the moving image file *.avi and the subtitle file *.smi, which are stored in the USB HDD 40, are transferred to the HDD 32 of the PC 30. Afterwards, when a user plays back images captured by the monitoring camera 10 through WINDOWS Media Player 33, the WINDOWS Media Player 33 loads the *.avi file from the HDD 32 of the PC 30, and displays the images and subtitles of the *.smi file together in step 60. Preferably WINDOWS Media Player 33 sets the image and subtitles as "caption and subtitle" located at "play" on a menu bar.

Figure 4:
FIG. 4 is a view illustrating a media player displaying an image capture time as a subtitle according to an exemplary embodiment of the present invention.

FIG. 4 is a view illustrating images captured by the monitoring camera 10 and an image capture time according to an exemplary embodiment of the present invention, in which WINDOWS Media Player 33 plays back the image captured time. As shown in the view played on WINDOWS Media Player 33, a year, month, date and time of capturing 400, corresponding to the images, are shown at the bottom left of the image. Since other functions of WINDOWS Media Player 33, except for the above mentioned functions, are well-known, a detailed description of such functions is omitted in exemplary embodiments of the present invention.

Since the general viewer, such as WINDOWS Media Player 33 displays images, along with the time the images were captured, users can easily recognize the time of capturing corresponding to the images.

Figure 5:
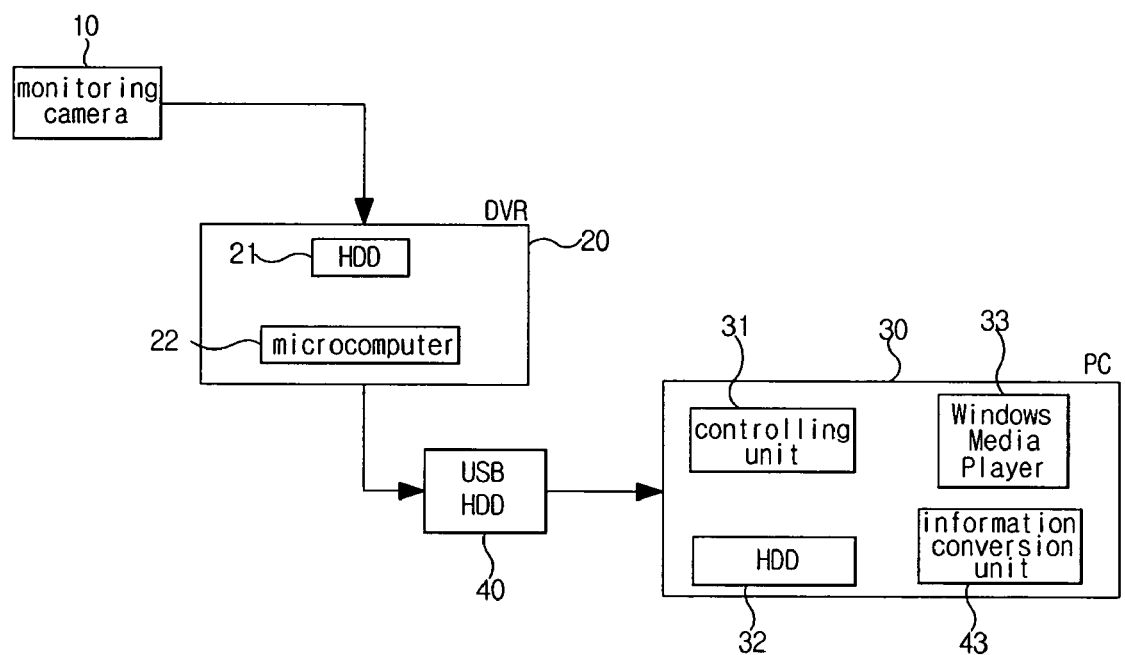
FIG. 5 is a block diagram illustrating a system for displaying an image capture time according to an exemplary embodiment of the present invention.

Referring to FIG. 5, a system for displaying an image capture time according to another exemplary embodiment of the present invention is described in detail below.

This embodiment of the present invention is implemented such that the information conversion unit 23 is included in the PC 30. Accordingly, the USB HDD 40 stores streaming data, DB data and event data therein. Additionally, the information conversion unit 23 creates moving image files formatted as *.avi and subtitle files formatted as *.smi. The method for displaying an image capture time is implemented such that steps 54 and 56 can be performed after streaming data. Also, DB data and event data which have been stored in the USB HDD 40 are stored in the HDD 21 of the PC 30. However, since configurations and operations regarding the system are the same as those of the first exemplary embodiment of the present invention, the detailed description thereof is omitted below.

Figure 6:
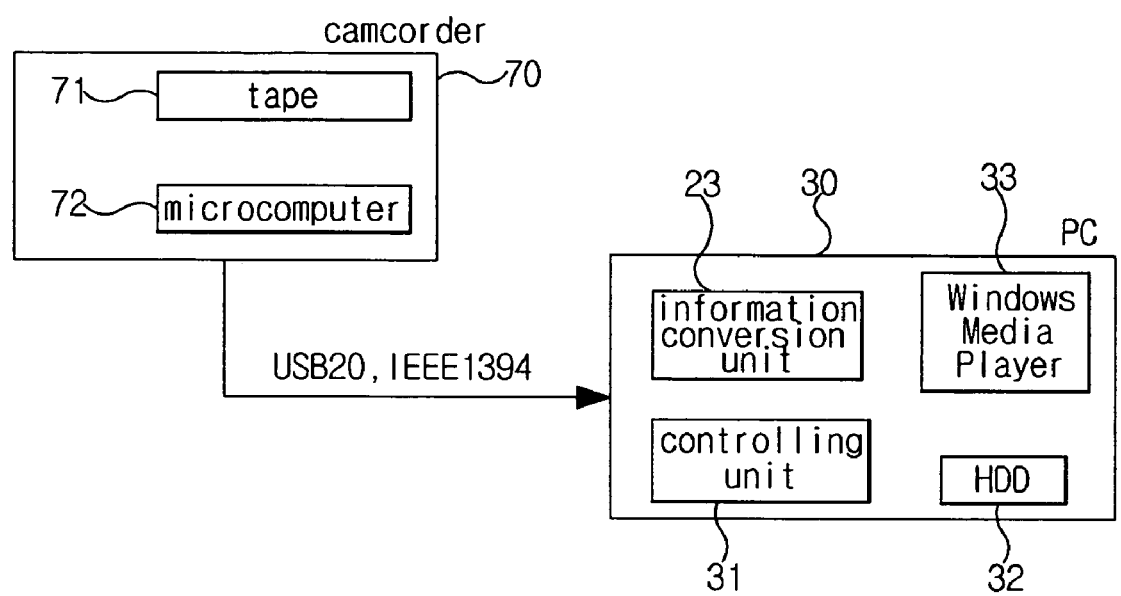
FIG. 6 is a block diagram illustrating a system for displaying an image capture time according to an exemplary embodiment of the present invention.

With reference to FIG. 6, a system for displaying an image capture time according to another exemplary embodiment of the present invention is described in detail below.

This embodiment employs a camcorder 70 instead of the monitoring camera 10 and the DVR 20 of the previously described exemplary embodiments. The camcorder 70 is connected to the PC 30 based on communication protocol USB 2.0, IEEE1394, so that images taken by the camcorder 70 can be transferred to the PC 30 and played back by WINDOWS Media Player 33 of the PC 30. Therefore, this embodiment does not require portable storage media.

The camcorder 70 includes a recording tape 71 for storing captured images therein, and a microcomputer 72 for storing the time of capturing corresponding images, such as the year, month, date, hour, minute, and second when the image is stored. When a data transmission command is transferred from the controlling unit 31 of the PC 30 to the camcorder 70, in a state where the camcorder 70 and the PC are interconnected to perform communication, the microcomputer 72 of the camcorder 71 transfers the corresponding images stored in the recording tape 71 and data that includes the time of capturing the images to the PC 30. In order to copy data from the camcorder 70 to the PC 30, software presently on the market can be used, such as WINDOWS Media Maker, ADOBE Premier, VIDEO STUDIO, and the like. The images and time of capture data for the images are copied from the camcorder 70 to the PC 30. This embodiment of the present invention preferably creates a moving image file, such as *.avi file and subtitle file, such as *.smi file, and plays back images taken by the camcorder 70 while displaying the images and the time of capturing images as a subtitle together.

As described above, when images stored in a storage media are played by general viewers installed in playback devices, such as a personal computer the system and method according to exemplary embodiments of the present invention can display the corresponding image together with the time when the corresponding image was captured. As a result, users can easily recognize when the played back image was taken.

In addition, the system and method according to exemplary embodiments of the present invention allow general viewers, such as widely used WINDOWS Media Player instead of a dedicate viewer, such as SMART VIEWER provided by a manufacturer of each storage device, to play back images stored in another storage media and times when the corresponding images were captured. As a result, users can easily recognize when the played back image was taken.

While the invention has been shown and described with reference to certain exemplary embodiments thereof, it will be understood by those skilled in the art that various changes in form and detail may be made therein without departing from the spirit and scope of the invention as defined by the appended claims.,

What is claimed is:

1. A system for displaying an image capture time comprising:
   a storage device which stores image data of a moving image, captured by an image capture unit, and environment data that is indicative of environment conditions for the capturing the moving image, converts the image data in one of .avi, .asf and .mov formats, and generates subtitle data, which comprises time information about a time when the moving image is captured, based on the environment data, the subtitle data being generated in one of .smi, .smil, .srt, .sub, .idx, and .don formats; and
   a viewer which receives the converted image data and the subtitle data, and displays the converted image data and the subtitle data at a same time.

2. The system as set forth in claim 1, wherein the environment data comprises information about at least one of a time of capturing an intra-coded frame in the capturing the moving image, a position of the intra-coded frame, a beginning time of the capturing the moving image, an end time of the capturing the moving image, and a type of the image data.

3. The system as set forth in claim 1, wherein the type of the image data comprises an indicator that is indicative as to whether the capturing the moving image is performed by a user's direct adjustment of moving the image capture unit or whether the capturing the moving image is automatically performed.

4. The system as set forth in claim 1, wherein the viewer is installed on a personal computer (PC) or a digital video player.

5. The system as set forth in claim 4, wherein the digital video player is a DivX® Player.

6. The system as set forth in claim 1, wherein the image capture unit is a monitoring camera, and the storage device is a digital video recorder (DVR), and
   wherein the converted image data and the subtitle data are stored in one of a compact disc (CD), a digital video disc (DVD), a universal serial bus (USB) memory and an external hard disc drive (HDD), and transferred from the DVR to the viewer that is installed on a personal computer (PC) or digital video player.

7. The system as set forth in claim 1, wherein the viewer is one of Windows Media Player®, QuickTime Player® and RealPlayer®.

8. A system for displaying an image capture time comprising:
   a storage device which stores image data of a moving image captured by an image capture unit and environment data that is indicative of environment conditions for the capturing the moving image; and
   a playback device which receives the captured moving image and the environment data, converts the image data in one of .avi, .asf and .mov formats, generates subtitle data, which comprises time information about a time when the moving images is captured, based on the environment data, and displays the converted image data and the subtitle data at a same time.

9. The system as set forth in claim 8, wherein the environment data comprises information about at least one of a time of capturing an intra-coded frame in the capturing the moving image a position of the intra-coded frame, a beginning time of the capturing the moving image, an end time of the capturing the moving image, and a type of the image data.

10. The system as set forth in claim 8, wherein the image capture unit is a monitoring camera, and the storage device is a digital video recorder (DVR), and
    wherein the converted image data and the subtitle data are stored in one of a compact disc (CD), a digital video disc (DVD), a Universal Serial Bus (USB) memory and an external hard disc drive (HDD), and transferred from the DVR to the playback device included in a personal computer (PC) or digital video player.

11. The system as set forth in claim 8, wherein the image capture unit and the storage device are comprised in a camcorder, wherein the converted image data and the subtitle data are transferred to the playback device included in a personal computer (PC) or digital video player.

12. The system as set forth in claim 8, wherein the playback device displays the converted image data and the subtitle data at a same time using a viewer application which is one of Windows Media Player®, QuickTime Player® and RealPlayer®.

13. A method for displaying an image capture time comprising:
    storing image data of a moving image, captured by an image capture unit, and environment data indicative of environment conditions with respect to the capturing the moving image;
    converting the image data in one of .avi, .asf and .mov formats, and generating subtitle data, which comprises time information about a time when the moving image is captured, based on the environment data, the subtitle data being generated in one of .smi, .smil, .srt, .sub, .idx, and .don formats; and
    receiving the converted image data and the subtitle data, and displaying the converted image data and the subtitle data at a same time.

14. The method as set forth in claim 13, wherein the environment data comprises information about at least one of a time of capturing an intra-coded frame in the capturing the moving image, a position of the intra-coded frame, a beginning time of the capturing the moving image, an end time of the capturing the moving image, and a type of the image data.

15. The method as set forth in claim 13, wherein the subtitle data is text-based subtitle data or graphic-based subtitle data.

16. The method as set forth in claim 13, wherein the type of the image data comprises an indicator that is indicative as to whether the capturing the moving image is performed by a user's direct adjustment of moving the image capture unit or whether the capturing the moving image are automatically performed.

* * * * *